(12) United States Patent
Koenig et al.

(10) Patent No.: US 10,962,151 B2
(45) Date of Patent: Mar. 30, 2021

(54) CONNECTION ARRANGEMENT FOR CONNECTING A PIPELINE

(71) Applicant: Walter Stauffenberg GmbH & Co. KG, Werdohl (DE)

(72) Inventors: Ulrich Stefan Koenig, Herscheid (DE); Alexander Aul, Unna (DE); Thomas Butzki, Luedenscheid (DE)

(73) Assignee: Walter Stauffenberg GmbH & Co. KG, Werdohl (DE)

( * ) Notice: Subject to any disclaimer, the term of this patent is extended or adjusted under 35 U.S.C. 154(b) by 267 days.

(21) Appl. No.: 16/079,644

(22) PCT Filed: Dec. 6, 2017

(86) PCT No.: PCT/EP2017/081680
§ 371 (c)(1),
(2) Date: Aug. 24, 2018

(87) PCT Pub. No.: WO2018/149532
PCT Pub. Date: Aug. 23, 2018

(65) Prior Publication Data
US 2019/0056050 A1 Feb. 21, 2019

(30) Foreign Application Priority Data

Feb. 20, 2017 (EP) ..................................... 17156966

(51) Int. Cl.
*F16L 19/12* (2006.01)
(52) U.S. Cl.
CPC ................................... *F16L 19/12* (2013.01)
(58) Field of Classification Search
CPC ......... F16L 19/045; F16L 19/08; F16L 19/10; F16L 19/106; F16L 19/12
(Continued)

(56) References Cited

U.S. PATENT DOCUMENTS

| 2,437,632 | A | * | 3/1948 | Wolfram | ................. F16L 19/08 285/342 |
| 3,325,192 | A | * | 6/1967 | Sullivan | ................. F16L 19/10 285/93 |

(Continued)

FOREIGN PATENT DOCUMENTS

| DE | 4219722 A1 * 12/1993 ............. F16L 19/12 |
| DE | 42 21 175 A1 3/1994 |

(Continued)

OTHER PUBLICATIONS

International Search Report of PCT/EP2017/081680, dated Mar. 19, 2018.

*Primary Examiner* — Aaron M Dunwoody
(74) *Attorney, Agent, or Firm* — Collard & Roe, P.C.

(57) ABSTRACT

A connection arrangement for connecting a metallic pipeline has a screw connection body having a pipe holder for the pipeline, a union nut that can be screwed onto the screw connection body and a cutting ring disposed between the screw connection body and the union nut. The cutting ring has an outer cone that interacts with an inner cone of the pipe holder of the screw connection body. The cutting ring has an essentially radial contact surface, subsequent to the outer cone, which surface limits tightening against a face surface of the screw connection body. An elastomer circumferential seal is disposed in a ring groove in the region of the outer cone of the cutting ring. The ring groove, which accommodates the elastomer circumferential seal, is disposed in the outer cone of the cutting ring, at a distance from its contact surface and, wherein a ring surface is formed between the ring groove and the contact surface.

10 Claims, 5 Drawing Sheets

(58) Field of Classification Search
USPC .............. 285/342, 341, 343, 354, 386, 382.7
See application file for complete search history.

(56) References Cited

U.S. PATENT DOCUMENTS

| | | | | |
|---|---|---|---|---|
| 3,453,009 | A | * | 7/1969 | Campbell ............... F16L 19/10 285/341 |
| 3,857,591 | A | * | 12/1974 | Voss ........................ F16L 19/12 285/341 |
| 4,309,050 | A | * | 1/1982 | Legris ................. F16L 19/0653 285/341 |
| 6,073,976 | A | * | 6/2000 | Schmidt .................. F16L 19/12 285/341 |
| 6,641,180 | B2 | * | 11/2003 | Udhoefer ............... F16L 19/10 285/382.7 |
| 7,093,864 | B2 | * | 8/2006 | Wasmuth ............ F16L 19/0218 285/288.1 |
| 2007/0267867 | A1 | * | 11/2007 | Kloss ................. F16L 19/0286 285/354 |

FOREIGN PATENT DOCUMENTS

| | | | | |
|---|---|---|---|---|
| DE | 4229502 | A1 | * 5/1994 | .............. B23P 11/00 |
| EP | 0 863 354 | B1 | 9/1998 | |
| WO | 93/25837 | A1 | 12/1993 | |

* cited by examiner

CONNECTION ARRANGEMENT FOR CONNECTING A PIPELINE

CROSS REFERENCE TO RELATED APPLICATIONS

This application is the National Stage of PCT/EP2017/081680 filed on Dec. 6, 2017, which claims priority under 35 U.S.C. § 119 of European Application No. 17156966.8 filed on Feb. 20, 2017, the disclosure of which is incorporated by reference. The international application under PCT article 21(2) was not published in English.

BACKGROUND OF THE INVENTION

1. Field of the Invention

The invention relates to a connection arrangement for connecting a pipeline, in particular a metallic pipeline, the arrangement having a screw connection body having a pipe holder for the pipeline, a union nut that can be screwed onto the screw connection body, as well as a cutting ring disposed between the screw connection body and the union nut, wherein the cutting ring has an outer cone that interacts with an inner cone of the pipe holder of the screw connection body in such a manner that it is deformed radially inward in some regions when the union nut is tightened, and cuts into the material of the pipeline with at least one cutting edge, with a notching effect, with shape fit, and wherein the cutting ring has an essentially radial contact surface, subsequent to the outer cone, which surface limits tightening against a face surface of the screw connection body, and wherein an elastomer circumferential seal is disposed in a ring groove in the region of the outer cone of the cutting ring, for contact inside the inner cone of the pipe holder of the screw connection body.

2. Description of the Related Art

Such a connection arrangement, as it is described in EP 0 863 354 B1, serves for a force-fit connection of a rigid pipeline, in particular a metallic pipeline, with a threaded coupling, and thereby allows a pipe screw connection. In this regard, the fluid-carrying region is at first sealed off with a metallic seal, which is formed, on the one hand, between the outer cone of the cutting ring and the inner cone of the pipe holder, and, on the other hand, by means of the cutting edges pressed into the pipe. Subsequent to this metallic seal, an elastomer circumferential seal is positioned as a soft seal. In this regard, the circumferential seal lies precisely against the transition to the radial shoulder of the cutting ring. During assembly, the cutting ring must be tightened to such an extent until the radial shoulder of the cutting ring makes contact with the face surface of the screw connection body. In this regard, the problem arises that the cutting ring is loosened by vibrations during operation in a hydraulic system, and that a gap can form between the shoulder of the cutting ring and the face surface of the screw connection body. If this gap becomes overly large, the soft seal can extrude into this gap due to the pressure in the hydraulic system. This extrusion means failure of the soft seal.

Furthermore, it has proven to be disadvantageous that the seal lies precisely at a sharp edge of the screw connection body in the region of the shoulder of the cutting ring/the face surface of the screw connection body. As a result, the risk of damage to the soft seal exists.

BRIEF SUMMARY OF THE INVENTION

This is where the invention wishes to provide a remedy. The invention is based on the task of making available a connection arrangement for connecting a pipeline, in particular a metallic pipeline of the stated type, in which arrangement the risk of extrusion of the soft seal into a gap formed between the cutting ring and the face surface of the screw connection body is prevented, and the risk of damage is avoided. According to the invention, this task is accomplished by the characteristics disclosed herein.

With the invention, a connection arrangement for connecting a pipeline, in particular a metallic pipeline of the stated type is made available, in which arrangement the risk of extrusion of the soft seal into a gap formed between the cutting ring and the face surface of the screw connection body is prevented, and the risk of damage is avoided. Because of the fact that the ring groove, which accommodates the elastomer circumferential seal, is disposed in the outer cone of the cutting ring, at a distance from its contact surface, wherein a ring surface is formed between the ring groove and the contact surface, contact of the circumferential seal with the contact surface of the cutting ring, and thereby also with a gap between the contact surface of the cutting ring and the face surface of the screw connection body, which might form during operation, is prevented. Extrusion of the circumferential seal into this gap is thereby effectively counteracted.

In a further development of the invention, the width of the conical ring surface delimited by the ring groove amounts to at least 0.4 mm, preferably at least 0.6 mm. As a result, good uncoupling of the circumferential seal from a gap that might form is achieved.

In an embodiment of the invention, the inner wall of the ring groove, which faces the contact surface, forms an angle of less than or equal to 90 degrees, preferably less than 89 degrees, with the ring surface. As a result, the circumferential seal is prevented from partially sliding out of the ring groove in the direction of the contact surface. This effect is particularly achieved at an angle of less than 89 degrees, since the inner wall thereby forms an undercut.

In a further embodiment of the invention, a projection that projects into the ring groove is formed on the inner wall of the ring groove, thereby forming an undercut. As a result, the circumferential seal is further prevented from partially sliding out in the direction of the contact surface.

In a further embodiment of the invention, the outer mantle surface of the projection continues the conical ring surface. As a result, edge formation is prevented, thereby reducing the risk of damage to the circumferential seal.

In a further development of the invention, the outer wall of the ring groove, which faces away from the contact surface, encloses an angle of greater than 90 degrees with the outer cone surface that borders on the groove, at least in a region that borders on the outer cone. As a result, the circumferential seal is supported in sliding into the ring groove, thereby counteracting damage to the circumferential seal during assembly.

Furthermore, installation of the circumferential seal is facilitated.

In an embodiment of the invention, the transition between ring groove and outer cone is configured to be rounded off. As a result, the circumferential seal is further supported in sliding into the ring groove.

In a further embodiment of the invention, the outer wall of the ring groove has an S-shaped contour in cross-section. As a result, good chambering of the circumferential seal is achieved, while simultaneously supporting the circumferential seal in sliding into the ring groove.

In an alternative embodiment of the invention, the transition between ring groove and outer cone is configured at a right angle, wherein the outer wall of the ring groove has a straight contour in cross-section, at least in some regions. In this regard, the ring groove is preferably configured to be wider than the circumferential seal. As a result, an escape zone that extends over the entire depth of the ring groove is formed, thereby improving the sealing effect. At the same time, flexible expansion of the circumferential seal is made possible in the unstressed assembled state, thereby preventing damage. It is advantageous if the outer wall of the ring groove, which faces away from the contact surface, encloses an angle of 90 degrees with the center axis of the line in this regard, at least in a region bordering on the outer cone.

In a further development of the invention, the depth of the ring groove amounts to at least 15 percent, preferably at least 25 percent of the cutting ring depth in this region. As a result, chambering of the circumferential seal is improved. The ring groove depth to be particularly preferred differs as a function of the construction size of the cutting ring. While a ring groove depth of about 25 percent of the thickness has proven to be particularly suitable in the case of large construction sizes, the optimal ring groove depth amounts to as much as 45 percent of the thickness in the case of cutting rings having a small construction size.

Furthermore, a cutting ring for use in such a connection arrangement, having the characteristics of claim 8, is an object of the invention.

Other further developments and embodiments of the invention are also disclosed.

BRIEF DESCRIPTION OF THE DRAWINGS

An exemplary embodiment of the invention is shown in the drawings and will be described in detail below. The figures show.

DETAILED DESCRIPTION OF THE INVENTION

Figure 1:
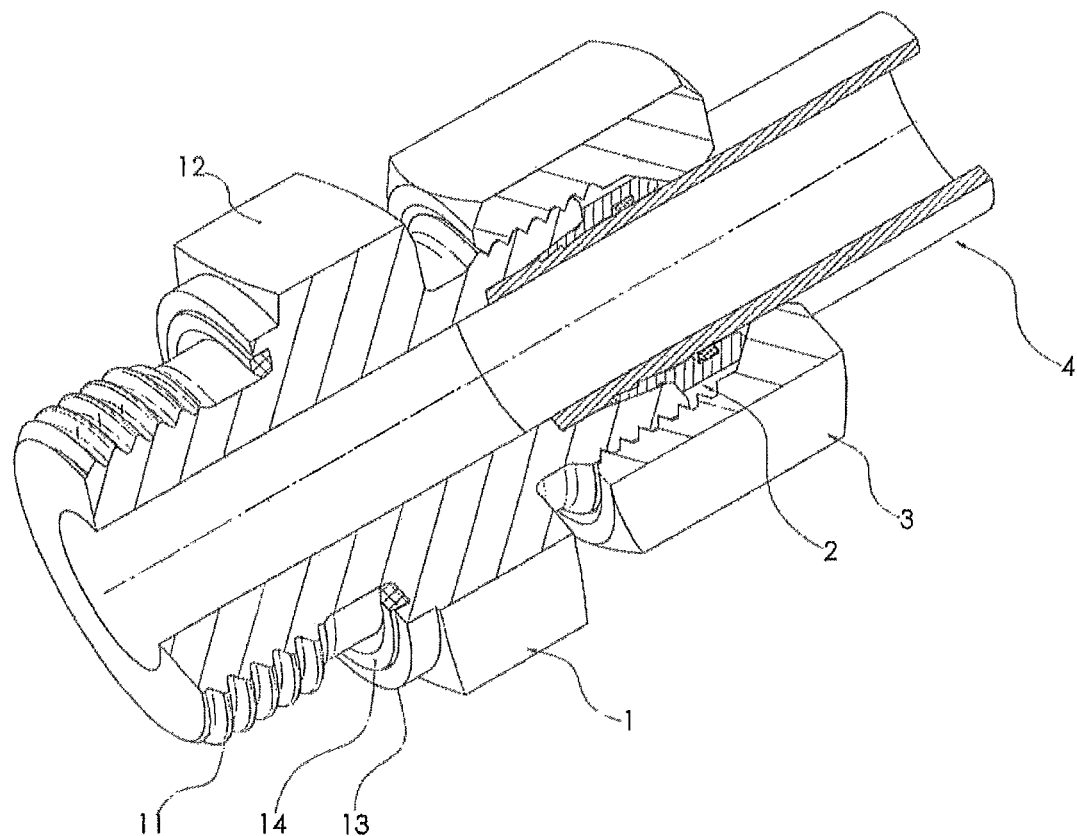
FIG. 1 the spatial representation of a connection arrangement.
Figure 2:
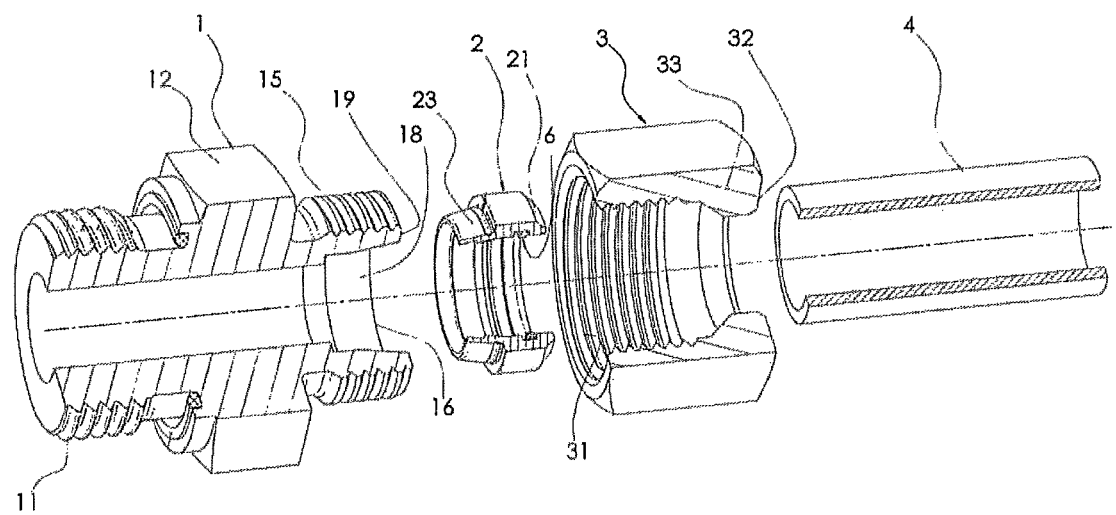
FIG. 2 the connection arrangement from FIG. 1 in an exploded representation.
Figure 3:
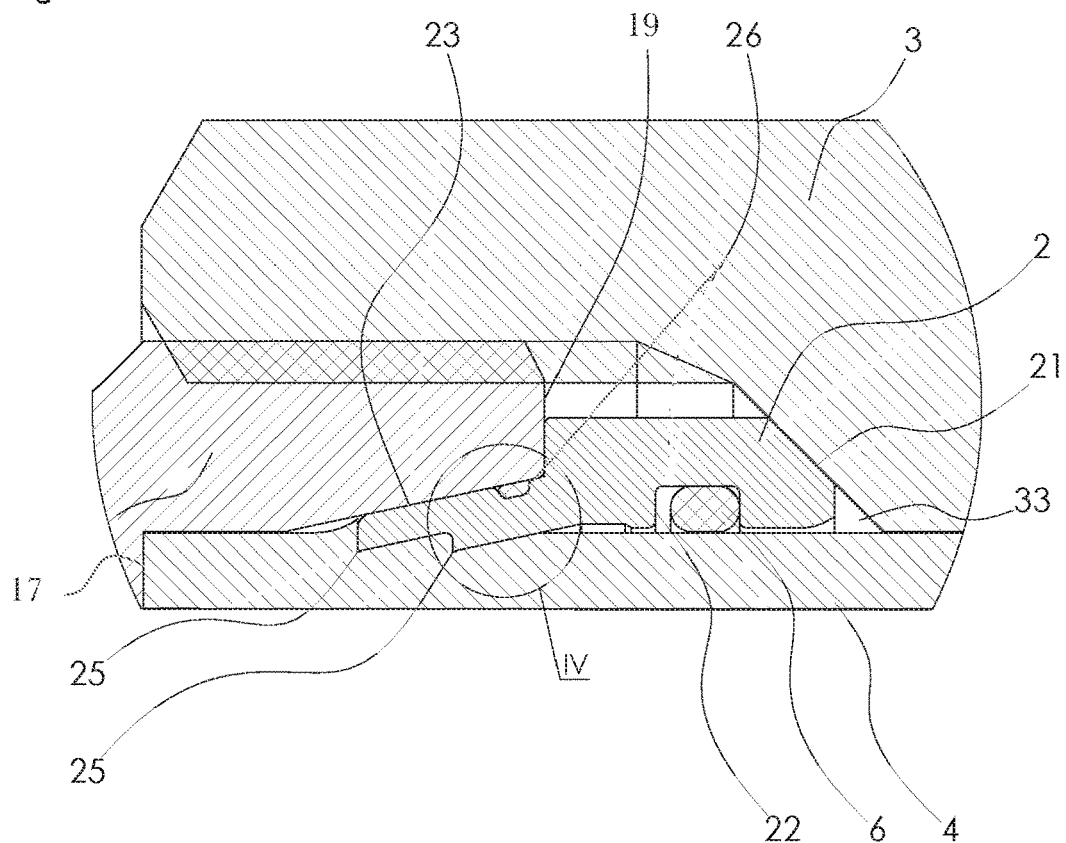
FIG. 3 the detailed representation of the connection location of the connection arrangement from FIG. 1 in cross-section.
Figure 4:
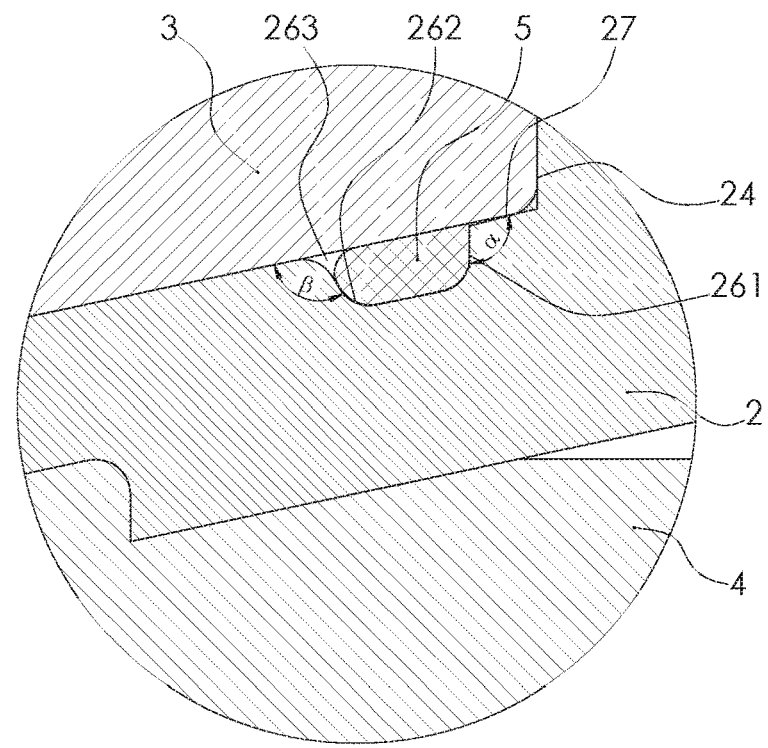
FIG. 4 the detailed representation of Detail IV from FIG. 3.

The connection arrangement chosen as an exemplary embodiment consists essentially of a screw connection body 1, which holds a cutting ring 2, and onto which a union nut 3 can be screwed, and thereby the cutting ring 2 can be driven into a held pipeline 4.

The screw connection body 1 is essentially a hollow cylindrical metal body, which is provided with a connection thread 11 on the end side, structured as an outside thread. A circumferential flange 12 is disposed at a distance from the connection thread 11, which flange is provided with a ridge 13 in the shape of a circular ring on its side facing the connection thread 11, which ridge delimits a ring groove for holding a sealing ring 14. The flange 12 is configured as a hexagon in the exemplary embodiment.

On its side of the flange 12 that lies opposite the connection thread 11, a further outside thread 15 for holding the union nut 3 is disposed. In the region of the outside thread 15, a diameter-widening pipe holder 16 is formed in the screw connection body 1, on the inside, by means of which holder a stop 17 is formed, and which holder has an inner cone 18 that widens outward on the end side.

The cutting ring 2 is essentially configured as a hollow cylinder and provided with a conically narrowing sliding surface 21 on the end side. On the inside, a ring groove 22 for holding an O-ring 6 for sealing the cutting ring 2 off with regard to the pipeline 4 is introduced. On its end that lies opposite the sliding surface 21, an outer cone 23 that is reduced in its outside diameter is formed on the cutting ring 2, by means of which cone a contact surface 24 is formed, and which cone is stepped on its inner mantle surface, thereby forming two cutting edges 25. On the outside, a ring groove 26 is introduced into the outer cone 23, at a distance from the contact surface 24, which groove holds a circumferential seal 5 and delimits a ring surface 27. In the exemplary embodiment, the outer cone has an angle of inclination of 12 degrees relative to its center axis of rotation, i.e. the opening angle amounts to 24 degrees. The width of the ring surface 27 amounts to 0.7 mm.

The ring groove 26 of the outer cone 23 has an essentially rectangular cross-section. The inner wall 261 of the ring groove 26, which wall faces the contact surface 24, encloses an angle $\alpha$ of 91 degrees with the ring surface 27. The outer wall 262 of the ring groove 26, which wall faces away from the contact surface 24, has an S-shaped cross-sectional contour, thereby forming a rounded-off sliding edge that allows the circumferential seal 5 to slide well into the ring groove 26. At the same time, an escape zone 263 for the circumferential seal 5 is formed in this region, which zone allows expansion of the circumferential seal 5 in the unstressed assembly state. When pressure is applied to the circumferential seal 5, it is pressed in the direction of the inner wall 261.

The union nut 3 is essentially configured in the manner of a hexagonal nut, the inside thread 31 of which corresponds with the outside thread 15 of the screw connection body 1. On its end that faces away from the flange 12, a ring collar 32 is formed onto the union nut 3, which collar has a passage for the pipeline 4. On the inside, the ring collar 32 is provided with an inner cone surface 33 that widens conically inward, the incline of which surface essentially corresponds to the incline of the sliding surface 21 of the cutting ring 2.

During assembly of the connection arrangement according to the invention, the pipeline 4 is introduced into the pipe holder 16 of the screw connection body until it lies against the stop 17. The cutting ring 2 is laid against the inner cone surface 33 of the union nut 3 with its sliding surface 21, and afterward, the nut is screwed onto the outside thread 15 of the screw connection boy. In this regard, the cutting ring 2 engages into the inner cone 18 of the pipe holder 16 of the screw connection body 1 with its outer cone 23, and interacts with the cone when doing so, wherein the cutting ring 2 is laid against the face surface 19 of the screw connection body 1 with its contact surface 24 when the union nut 3 is tightened, and compressed radially inward in the region of the outer cone 23, thereby causing the cutting edges 25 of the cone to penetrate into the material of the pipeline 4, in particular with shape fit and with a notching effect. At the same time, a wedging effect is achieved between the conical sliding surface 21 of the cutting ring 2 and the inner cone surface 33 of the ring collar of the union nut, for the purpose of radially pressing the cutting ring 2 and also for self-centering.

The cutting ring 2 has the function, for one thing, of mechanically fixing the pipeline 4 in place by means of the shape-fit connection achieved by way of the cutting edges 25 of the ring; for another, it has a metallic sealing function by way of the cutting edges 25 that cut into the pipeline, on the one hand, and its outer cone 23, which lies against the inner cone 18 of the pipeline holder 16, forming a metallic seal, on the other hand, wherein an additional seal is provided by way of the circumferential seal 5 that is disposed between these cones and structured as a soft seal, and disposed in the ring groove 22 in chambered manner. In this regard, an escape zone 263 is formed by means of the S-shaped cross-sectional contour of the outer wall 262 of the ring groove 26.

Figure 5:
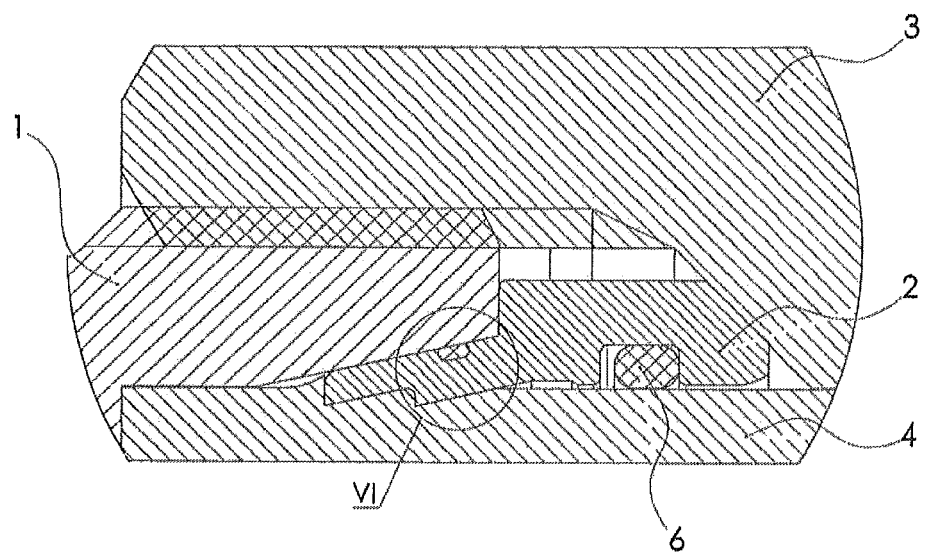
FIG. 5 the detailed representation of the connection location of a connection arrangement of a further embodiment in cross-section.
Figure 6:
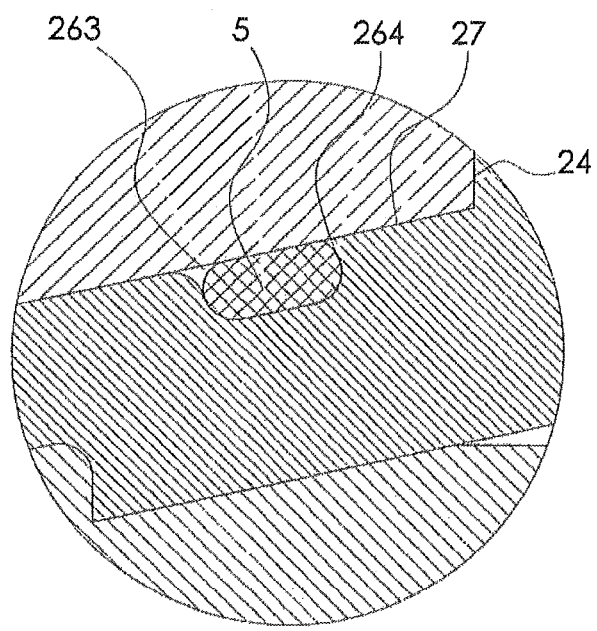
FIG. 6 the detailed representation of Detail VI from FIG. 5.
Figure 7:
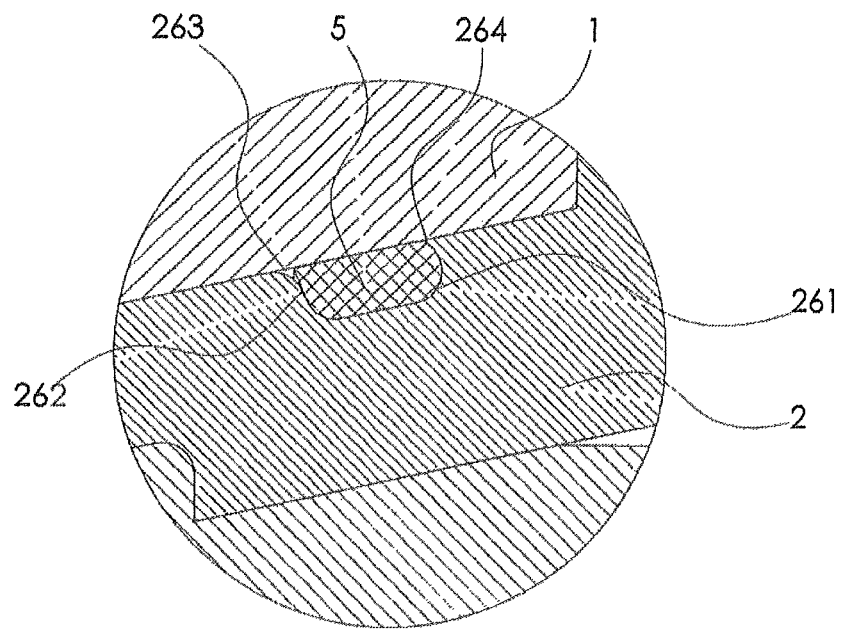
FIG. 7 the representation of the arrangement from FIG. 6 with a hydraulically stressed circumferential seal.

In the exemplary embodiment according to FIG. 5, the ring groove 26 of the exemplary embodiment described above is structured in modified manner, wherein a projection 264 that projects inward is formed in the inner wall 261 of the groove. In this regard, the projection 264 is configured in such a manner that it ends flush with the ring surface 27 with its outer side and continues this surface. In this regard, its inner surface continues the inner contour of the inner wall 261, which is thereby supplemented to form an arc-shaped cross-sectional contour.

As a result, an undercut is achieved, thereby bringing about clearly improved chambering of the circumferential seal 5. This embodiment of the ring groove 26, supplemented with the projection 264, furthermore brings about clearly better installation ability of the cutting ring 2, since the circumferential seal 5 can be pressed into this undercut during the installation process. The circumferential seal 5 can assume an optimally sealing position in operation by means of the applied hydraulic pressure, due to the escape zone 263 that is provided, wherein it is constantly pressed against the undercut and held in place by it.

Figure 8:
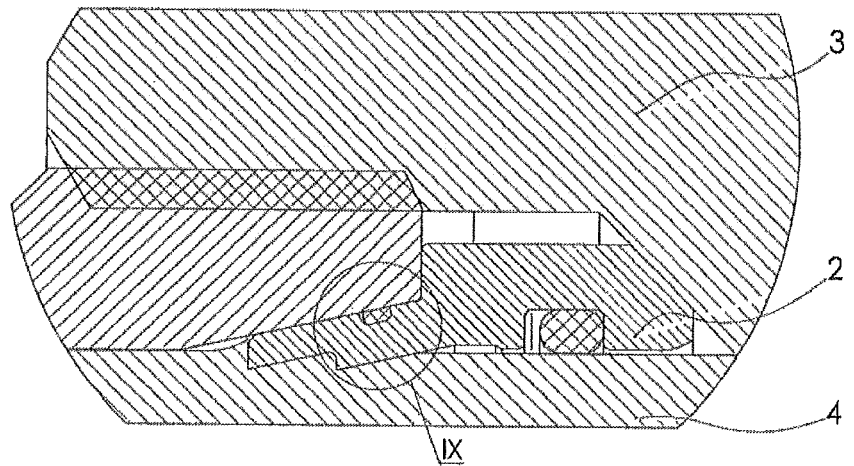
FIG. 8 the detailed representation of the connection location of a connection arrangement of a third embodiment in cross-section, and FIG. 9 the detailed representation of Detail IX from FIG. 8.
Figure 9:
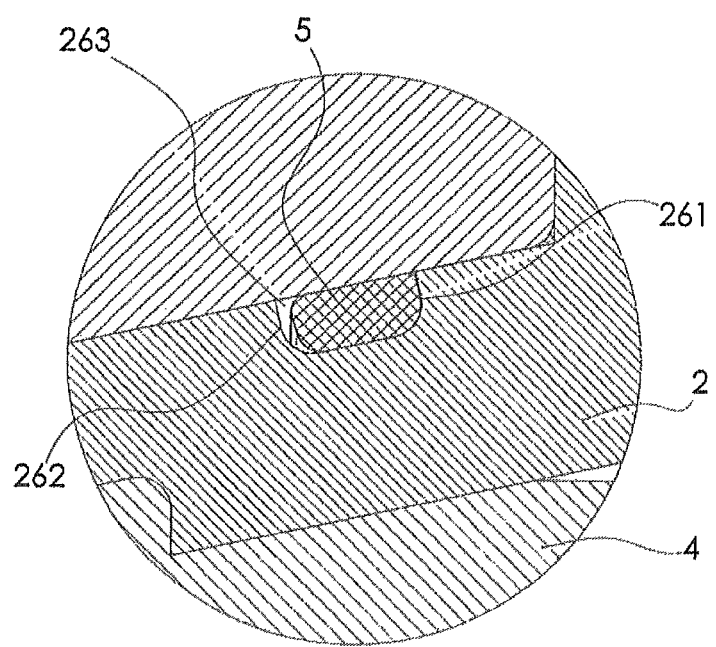

In the exemplary embodiment according to FIG. 8, the ring groove 26 is configured to be wider than the circumferential seal 5, wherein the outer wall 262 is oriented essentially orthogonally relative to the center axis of the pipeline 4. Aside from the rounded-off transition to the ring groove base, the outer wall 262 has a straight cross-sectional contour in this regard, which contour makes a sharp-edged transition into the surface of the outer cone 23. As a result, an escape zone 263 that extends over the entire depth of the circumferential seal 5 is formed, which zone allows flexible expansion of the circumferential seal 5 during assembly, in other words in the unstressed state. When pressure is applied, the seal is pressed in the direction of the inner wall 261, wherein the sealing effect is further reinforced by fluid that penetrates into the escape zone.

The invention claimed is:

1. A connection arrangement for connecting a pipeline, the arrangement having a screw connection body having a pipe holder for the pipeline, a union nut that can be screwed onto the screw connection body, as well as a cutting ring disposed between the screw connection body and the union nut, wherein the cutting ring has an outer cone that interacts with an inner cone of the pipe holder of the screw connection body in such a manner that the outer cone is deformed radially inward in some regions when the union nut is tightened, and cuts into a material of the pipeline with at least one cutting edge, with a notching effect, with shape fit, wherein the cutting ring has an essentially radial contact surface, subsequent to the outer cone, which surface limits tightening against a face surface of the screw connection body, wherein an elastomer circumferential seal is disposed in a ring groove in the region of the outer cone of the cutting ring, for contact inside the inner cone of the pipe holder of the screw connection body, wherein the ring groove, which accommodates the elastomer circumferential seal, is disposed in the outer cone of the cutting ring, at a distance from the contact surface, wherein a ring surface is formed between the ring groove and the contact surface, and wherein a projection that projects into the ring groove is formed on the inner wall of the ring groove, thereby forming an undercut.

2. The connection arrangement according to claim 1, wherein the width of the ring surface amounts to at least 0.4 mm.

3. The connection arrangement according to claim 1, wherein the inner wall of the ring groove, which inner wall faces the contact surface, encloses an angle of less than or equal to 90 degrees.

4. The connection arrangement according to claim 1, wherein an outer mantle surface of the projection continues the ring surface.

5. The connection element arrangement according to claim 1, wherein the outer wall of the ring groove, which faces away from the contact surface, encloses an angle of greater than 90 degrees with the outer cone surface that borders on the outer wall, at least in a region that borders on the outer cone.

6. The connection arrangement according to claim 5, wherein a transition between the ring groove and the outer cone is configured to be rounded off.

7. The connection arrangement according to claim 6, wherein the outer wall of the ring groove has an S-shaped contour in cross-section.

8. The connection arrangement according to claim 5, wherein the transition between the ring groove and the outer cone is configured at a right angle, wherein the outer wall of the ring groove has a straight contour in cross-section, at least in some regions.

9. The connection arrangement according to claim 8, wherein the outer wall of the ring groove, which faces away from the contact surface, encloses an angle of 90 degrees with a center axis of a line, at least in a region bordering on the outer cone.

10. The connection arrangement according to claim 1, wherein a depth of the ring groove amounts to at least 15 percent of the cutting ring depth in this region.

* * * * *